Dec. 14, 1943. J. O. OSTERBERG 2,336,500
APPARATUS FOR DETERMINING SOIL AND HYDROSTATIC PRESSURE
Filed May 29, 1942

INVENTOR
JOHN O. OSTERBERG
BY
ATTORNEYS

Patented Dec. 14, 1943

2,336,500

UNITED STATES PATENT OFFICE 2,336,500

APPARATUS FOR DETERMINING SOIL AND HYDROSTATIC PRESSURE

Johj O. Osterberg, Vicksburg, Miss.

Application May 29, 1942, Serial No. 445,092

7 Claims. (Cl. 177—351)

(Granted under the act of March 3, 1883, as amended April 30, 1928; 370 O. G. 757)

The invention described herein may be manufactured and used by or for the Government for governmental purposes, without the payment of any royalty thereon to me.

This invention relates generally to pressure measuring apparatus but more particularly to a device for measuring soil pressure and pore water pressure existing in earth foundations and earth structures.

One object of the invention is to provide a pressure cell which can be buried in the earth and by means of electrical conductors connected therewith, and to a pressure indicating device, which may be located remotely therefrom, measure the total pressure normal to it and the effective soil pressure, which is the total pressure minus the pore water pressure. Thus it is possible to measure the pressure or stress and the rate of consolidation of the soil at any point in an earth structure or foundation.

Another object of the invention is to provide a device consisting of a single unit by which both soil and hydrostatic pressure can be measured.

Another object of the invention is to provide a hydrostatic pressure cell, of the type described which is formed in a single unit, having no projections, little thickness, in comparison to its diameter, and has a compressibility equal or nearly equal to the soil in which it is placed.

With these and other objects in view, the invention consists in certain novel details of construction, combination and arrangement of parts, as will be more fully hereinafter set forth and pointed out in the claims.

In the measuring of soil pressure, it is essential that the pressure cell used does not change materially the stress conditions which would exist at a point in question in a soil if the device were not existent at that point, or in other words, the presence of a pressure measuring device must not change the pressure it is to measure. To fulfill these conditions, the cell must be relatively thin in relation to its diameter, it must compress as the soil surrounding it does, and must not require any motion to register the pressure, all of which requirements are met by the present invention.

Referring to the figures in which like parts are indicated by similar reference characters:

Figure 1:
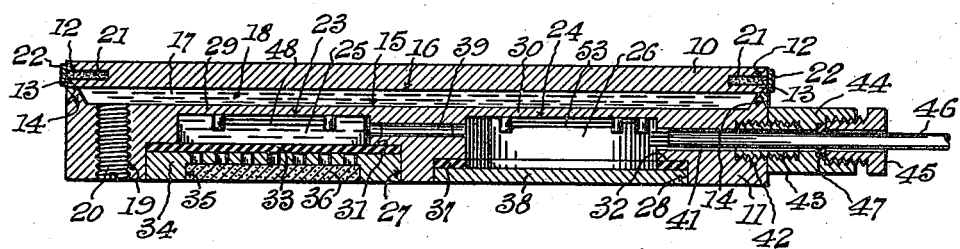
Fig. 1 is a view of the combined soil and hydrostatic cell, taken on the line 1—1 in Fig. 2.

The device is formed with two circular plates 10 and 11, one placed upon the other and rigidly attached thereto, as shown in Fig. 1. The top plate 10 is provided with a groove 12 which encircles its edge and thus forms a narrow rim 13 which is brazed or welded on its edge to a circular bevel 14 on the edge of the bottom plate 11. The lower plate is provided with a lower countersunk surface 15 which extends to within a short distance of the circumference. This surface 15 is flat throughout its extent, and is parallel to the lower surface 16 of the upper plate 10. The narrow space 17 between the two plates 10 and 11 is filled with oil 18 or other suitable liquid through a hole 19 which is drilled in the lower plate and tapped for the reception of threaded filler plug 20. The groove 12 around the edge of the top plate 10 is packed with soft plastic material 21 and the periphery of the top plate 10 is wrapped with tape 22.

The bottom plate is formed with two circular spaces 23 and 24, each having an upper portion which functions as a gauge chamber as indicated by the numerals 25 and 26, and a lower portion 27 and 28, respectively, of larger diameter which are adapted to receive closure elements. The upper portions of the spaces which form gauge chambers 25 and 26 each extends to a thin partition wall, the upper surfaces of which lie in the plane of the countersunk surface 15 of the bottom plate 11. The partition walls at the upper extremity of the circular chambers function as diaphragms separating the oil chamber 17 from the gauge chambers 25 and 26. These diaphragms are designated by the numerals 29 and 30.

Ledges 31 and 32 extend from the circular edges of the gauge chambers 25 and 26 to the circular edges of the lower portion of the circular spaces 23 and 24. Upon the ledge 31 of chamber 25 is placed an oil resistant diaphragm 33 retained in position by a circular cover plate 34, which fits snugly within the lower portion 27 of the space 23 which is of larger diameter. The cover plate is provided with a concentric circular countersunk portion 35 into which is fitted a disc shaped porous stone 36. Upon the ledge of chamber 26 is placed a gasket 37 made of rubber, neoprene, or other suitable material, adjacent to which is placed a cover plate 38 formed as a circular disc which fits snugly into the lower portion 28 of the space 24.

The lower circular plate 11 is provided with tubular passages 39 and 40 which connect the chambers 25 and 26, and is also provided with a tubular passage 41 which connects the chamber 26 with a tapped hole 42 in the circumference of the lower circular plate. Within the tapped hole 42 is fitted a nipple 43 which projects beyond the circumference of the lower circular plate 11 and is adapted to receive the internally threaded connecting member 44 which is tapped at both ends. The outer end of this member 44 is adapted to fit a gland nut 45 through which is passed an insulated cable 46 which extends through the connecting member 44 into the tubular passage 41 from the gauge chamber 26. The nut 45 is adapted to compress a rubber gasket 47 to tightly seal the end of the cable 46 within the lower plate.

Pressure acting on the cell is transmitted to the oil 18 in the narrow chamber 17 through the top plate 10 by virtue of the narrow rim 13. The pressure in the oil causes the diaphragms 29 and 30 to deflect. The small volume change caused by the deflection of the diaphragms 29 and 30 and by the relatively small compressibility of the oil causes the top plate 10 to move toward and parallel to the bottom plate 11. Beneath these diaphragms 29 and 30 are located the chambers 25 and 26 in which are located strain gauges.

The chamber 26 contains air at atmospheric pressure and is sealed from the external soil and water pressure by the cover plate 38 and the gasket 37. Chamber 25 contains water or oil or other suitable liquid and is sealed from external soil pressure, but not from water pressure, by means of the porous stone 36 held by the cover plate 34 and the oil resistant diaphragm 33.

Pressure of the soil pore water is transmitted freely through the porous stone 36, and through the flexible thin rubber diaphragm 33, to the liquid in chamber 25. Thus the pressure in chamber 25 is always the same as the external soil pore water pressure.

A strain gauge 48 is attached to terminals 49 and 50 within the chamber 25 and the gauge terminals connected through insulated conductors 51 and 52 which pass through the tubular passages 39 and 40 to chamber 26 where one is connected to the terminal 54 and the other passes through the chamber 26 and through the tubular passage 41 to the exterior of the cell. The tubular passages 39 and 40 between the gauge chambers through which the conductors 51 and 52 pass are sealed to prevent any liquid in chamber 25 from passing into chamber 26. A second strain gauge 53 is attached to terminals 54 and 55 within chamber 26 and the gauge terminals connected to insulated conductors 56 and 57 which pass through tubular passage 41 to a measuring device.

The deflection of diaphragms 29 and 30 causes strain on their surfaces, the strains effect a change of resistance in the electric wire strain gauges 48 and 53 which are cemented or baked to the under side of the diaphragms 29 and 30, respectively, and may therefore be measured by a Wheatstone bridge as will be further described.

Figure 2:
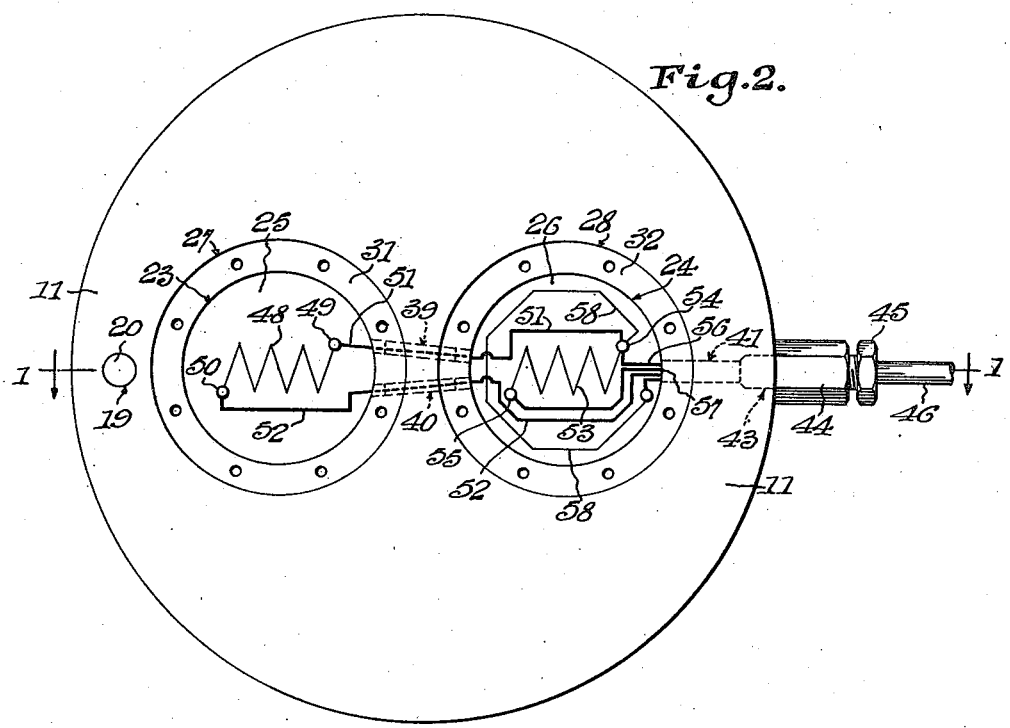
Fig. 2 is a bottom plan view of the device with the rubber diaphragm cover plates and porous stone plate removed from the chamber.
Figure 3:
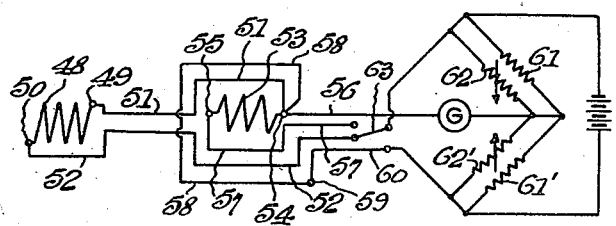
Fig. 3 is a diagrammatic view showing the circuit connections between the pressure responsive gauges and the pressure measuring device.

A dummy wire resistance strain gauge 58, exactly similar to the active gauges 48 and 53 and having very nearly the same total electrical resistance as 48 and 53, is cemented or baked to the diaphragm 30, in a region of little or no stress. The purpose of the dummy gauge 58 is to compensate for temperature. The electrical connections as shown in Fig. 2 enable the difference in resistance between the dummy gauge 58 and each of the active gauges 48 and 53 to be measured by a special Wheatstone electrical bridge, as a function of the strain in the diaphragms 29 and 30 as illustrated diagrammatically in Fig. 3. Thus the total pressure on the cell is transmitted to the oil 18, and, through diaphragm 30, to the strain gauge 53, the change in resistance in which is measured by measuring the difference between gauge 53 and dummy gauge 58 by means of the Wheatstone bridge. The oil pressure on diaphragm 29 is partially counterbalanced by the water pressure acting on the lower face in the chamber 25. Thus, the strain in the diaphragm is measured by the change of difference in resistance between the active gauge 53, and the dummy gauge 58, by said special Wheatstone bridge and is a measure of the difference between total pressure and water pressure in the soil.

A four wire, rubber covered electrical cable 46 leads from the chamber 26 to the said special Wheatstone bridge on the ground surface or at any other convenient location. The wire cable 46 emerges from the chamber 26 through the gland nut 45. The chamber 26 is sealed from external pressure by tightening the gland nut 45 against the rubber gasket 47. The four wire cable 46 contains wire 56 connected to terminal 54 which is common to dummy gauge 58 and active gauge 53, wire 57 which is connected to terminal 55 of active gauge 53, wire 52 connected to terminal 50 of active gauge 48, and wire 60 connected to terminal 59 of the dummy gauge 58. The active gauges 48 and 53 are connected by the wire 51 as mentioned above.

The four wires of the cable 46 from the active gauge members 48 and 53 and the dummy gauge member are connected to the Wheatstone bridge as follows: wire 56 leads to the galvanometer G, wire 57 or 52 through switch blade 63 to the arm of the bridge having constant and variable resistances 61 and 62, respectively, and 60 to the constant and variable resistances 61' and 62'.

The strain gauges each consists of a continuously solid metallic wire filament, preferably about 0.001 to 0.003 of an inch in diameter, cemented throughout its entire length to the surface of a member whose strain (deformation) is to be measured. The cement may be "Glyptol" or "Duco Household Cement." The cement serves as an electrical insulation although a thin piece of electrical insulation may be interposed between the filament and surface of the strained member and cemented to each.

The fundamental theory is that the electrical resistance of the filament changes in proportion to its strain. The gauge forms an integral part of the diaphragm of the pressure cell to which it is cemented and therefore the strain of the gauge is that of the diaphragm. The gauge filament may consist of what is known by the tradename of "Advance," "Nichrome," or other similar wire.

To measure the change in resistance of the filament, it is placed in a Wheatstone bridge circuit so as to form one arm of the bridge, as shown in Fig. 4.

The galvanometer G measures the unbalance of the bridge caused by change of the strain in the filaments. A dummy or inactive filament of the same length and resistance as the active filaments forms another arm of the Wheatstone bridge as shown. By having it cemented to an inactive portion of the same diaphragm and placed in the gauge chamber of the pressure cell, the dummy filament compensates for temperature. This is accomplished as follows: Since for a given temperature change the change in strain of the diaphragm and the dummy plate is the same and also the resistance change of the filaments is the same, these changes being of equal magnitude in the dummy and active filaments will balance out in the circuit and will thereby not affect the galvanometer deflection. The pressure cells are calibrated by measuring the change in resistance of the active filaments when strained by the application of a known pressure to the metal diaphragms.

In the present invention, the measuring device contains two pressure-responsive elements, one responding to total or combined soil and hydrostatic pressure, and the other responding to effective pressure which is the total minus the hydrostatic pressure. In effect, this cell combines the features of the hydrostatic pressure indicator and a soil pressure cell. Soil and hydrostatic pressures act on the top plate 10 and are transmitted to a confined body of oil 18 by virtue of a flexible outer rim 13 formed by machining a slot or groove 12 in the top plate. The oil pressure acts on the two pressure-sensitive diaphragms 29 and 30. Since the chamber 26 is sealed from external water pressure by the plate and gasket 36 and 37, the diaphragm 30 is sensitive to the soil or total pressure. Chamber 25, however, contains oil and is sealed from the external pressure by an oil-resistant sheet or diaphragm 33 and a perforated plate 34. The rubber sheet, being flexible, allows hydrostatic or pore water pressure to be transmitted to the oil in the chamber 17. Thus diaphragm 29 is sensitive to total minus hydrostatic pressure. The filaments of the two pressure-sensitive diaphragms and a common dummy filament are connected to the control box by a four-conductor, rubber covered cable 46.

Having described my invention, what I claim as new and wish to secure by Letters Patent is:

1. A pressure measuring device comprising a pressure cell provided with an oil chamber having a compressible cover plate and a hydrostatic pressure chamber and a soil pressure chamber each of which is separated from said oil chamber by a diaphragm, said hydrostatic pressure chamber having closure elements comprising a diaphragm and filtering members adjacent said diaphragm and said soil pressure chamber being provided with closure elements, an active resistance gauge located within said hydrostatic chamber and an active and a dummy temperature compensating gauge located within said soil pressure chamber, said gauges being mounted on said diaphragms in their respective chambers, and means including insulated electrical conductors leading from said gauges through sealed passages in said cell to a remotely located electrical resistance measuring device adapted to indicate corresponding resistances for varying pressures affecting said gauges.

2. A pressure measuring device comprising a pressure cell provided with an oil chamber having a compressible cover plate and a hydrostatic pressure chamber and a soil pressure chamber, each of which is separated from said oil chamber by a diaphragm formed integral with said cell, said hydrostatic pressure chamber having closure elements comprising an oil resistant diaphragm and filtering members including a perforated disc and a porous stone disc, and said soil pressure chamber having closure elements including a sealing gasket and a disc, an active resistance gauge located within said hydrostatic chamber and an active and a dummy temperature compensating gauge located within said soil pressure chamber, said gauges being mounted on said diaphragms in their respective chambers, and means including insulated electrical conductors leading from said gauges through sealed passages in said cell to a remotely located electrical resistance measuring device adapted to indicate corresponding resistances for varying pressures affecting said gauges.

3. A pressure measuring device comprising a pressure cell provided with an oil chamber having a cover plate provided with a flexible rim permitting compression on the contents thereof, and a hydrostatic pressure chamber and a soil pressure chamber each of which is separated from said oil chamber by a diaphragm formed integral with said cell, said hydrostatic pressure chamber having closure elements comprising an oil resistant diaphragm and a filtering member including a perforated disc and a porous stone disc, and said soil pressure chamber having closure elements including a sealing gasket and a disc, an active resistance gauge located within said hydrostatic chamber and an active and a dummy temperature compensating gauge located within said soil pressure chamber, said gauges being mounted on said diaphragms in their respective chambers, and means including insulated electrical conductors leading from said gauges through sealed passages in said cell to a remotely located electrical resistance measuring device adapted to indicate corresponding resistances for varying pressures affecting said gauges.

4. A pressure measuring device comprising a disc shaped upper and lower circular plates, the upper plate having a narrow flexible rim, and the lower plate formed with an upper circular countersunk portion having a beveled circumferential edge forming an oil chamber which is sealed by attaching said beveled edge to said rim, a hydrostatic pressure chamber and a soil pressure chamber formed within said lower plate, thin partition walls functioning as diaphragms separating said chambers from said oil chamber, closure elements comprising an oil resistant diaphragm, a perforated plate and a porous disc enclosing said hydrostatic pressure cell and solid cover plate mounted upon a gasket enclosing said soil pressure chamber, an active resistance gauge located within said hydrostatic chamber and an active and a dummy gauge located within said soil pressure chamber, said gauges being mounted on said diaphragms in their respective chambers, a tubular passage from said soil pressure chamber to the exterior of said device, and connecting leads from the terminals of said gauges passing through said tubular passages to a Wheatstone bridge adapted to measure the difference in resistance between the active soil pressure gauge and the dummy gauge, and the difference in resistance between the hydraulic gauge and the dummy gauge to thereby determine the difference between the total and water pressure in the soil.

5. A pressure measuring device comprising a disc shaped upper and lower circular plates, the upper plate having a narrow flexible rim, and the lower plate formed with an upper circular countersunk portion having a beveled circumferential edge forming an oil chamber which is sealed by attaching said beveled edge to said rim, a hydrostatic pressure chamber and a soil pressure chamber formed within said lower plate, thin partition walls formed integral with said lower plate functioning as diaphragms separating said chambers from said oil chamber, closure elements comprising an oil resistant diaphragm, a perforated plate and a porous disc enclosing said hydrostatic pressure cell and solid cover plate mounted upon a gasket enclosing said soil pressure chamber, resistance gauges attached to said partition walls comprising an active resistance gauge located within said hydrostatic chamber and an active and a dummy gauge located within said soil pressure chamber, a tubular passage from said soil pressure chamber to the exterior of said device, and connecting leads from the terminals of said gauges passing through said tubular passages to a Wheatstone bridge adapted to measure the difference in resistance between the active soil pressure gauge and the dummy gauge, and the difference in resistance between the hydraulic gauge and the dummy gauge to thereby determine the difference between the total and water pressure in the soil.

6. A pressure measuring device including a pressure cell containing a gauge chamber containing a liquid and provided with a diaphragm at either end adapted to transmit respectively total soil pressure and pore water pressure to the interior thereof, and a gauge chamber, containing air at atmospheric pressure, provided with a diaphragm at one end thereof, adapted to transmit soil pressure to the interior thereof, an oil chamber adjacent to a diaphragm of each gauge chamber, said oil chamber provided with a compressible cover plate adapted to transmit soil pressure through said oil to the adjacent diaphragms, electrical resistance strain gauges located within said gauge chambers and attached to diaphragms thereof, and electrically connected to a remotely located resistance measuring device adapted to measure the pressure on said diaphragms of said gauges to determine the total pressure of the soil and the total pressure minus the hydrostatic pressure therein.

7. A device of the character described comprising a pressure cell provided with an oil chamber having a compressible cover plate and a hydrostatic pressure chamber and a soil pressure chamber each of which is separated from said oil chamber by a diaphragm, said hydrostatic pressure chamber having closure elements comprising an oil resistant diaphragm and filtering members adjacent said diaphragm, and said soil pressure chamber being provided with closure elements, an active resistance gauge attached to said diaphragm within said hydrostatic chamber and an active and a dummy temperature compensating gauge attached to said diaphragm within said soil pressure chamber, and a measuring device in electrical relation with said gauges adapted to indicate corresponding resistances for varying pressures affecting said gauges.

JOHJ O. OSTERBERG.